(12) United States Patent
Tamaki (10) Patent No.: US 9,083,879 B2
(45) Date of Patent: Jul. 14, 2015

(54) FOCUS DETECTION APPARATUS, CONTROL METHOD THEREOF, AND IMAGE PICKUP APPARATUS

(71) Applicant: CANON KABUSHIKI KAISHA, Tokyo (JP)

(72) Inventor: Yoshihito Tamaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 13/855,336

(22) Filed: Apr. 2, 2013

(65) Prior Publication Data

US 2013/0265483 A1   Oct. 10, 2013

(30) Foreign Application Priority Data

Apr. 10, 2012   (JP) ................. 2012-089070

(51) Int. Cl.
  *G03B 13/00*   (2006.01)
  *H04N 5/232*   (2006.01)
  *H04N 5/369*   (2011.01)

(52) U.S. Cl.
  CPC ......... *H04N 5/23212* (2013.01); *H04N 5/3696* (2013.01)

(58) Field of Classification Search
  CPC . H04N 5/23212; H04N 5/357; H04N 5/3572; H04N 5/3696
  USPC .................. 348/345, 349, 354, 356
  See application file for complete search history.

(56) References Cited

U.S. PATENT DOCUMENTS

| | | | | |
|---|---|---|---|---|
| 2010/0157094 A1* | 6/2010 | Takamiya | ................. | 348/229.1 |
| 2011/0085786 A1* | 4/2011 | Tamaki | ................. | 396/104 |
| 2011/0164165 A1* | 7/2011 | Hashimoto et al. | ........... | 348/340 |
| 2013/0120643 A1* | 5/2013 | Tamaki | ................. | 348/349 |
| 2013/0250149 A1* | 9/2013 | Yamasaki | ................. | 348/241 |

FOREIGN PATENT DOCUMENTS

| | | |
|---|---|---|
| JP | 01-216306 A | 8/1989 |
| JP | 04-267211 A | 9/1992 |
| JP | 05-127074 A | 5/1993 |
| JP | 2000-020691 A | 1/2000 |

\* cited by examiner

*Primary Examiner* — Daniel M Pasiewicz
(74) *Attorney, Agent, or Firm* — Cowan, Liebowitz & Latman, P.C.

(57) ABSTRACT

A focus detection apparatus which performs a center-of-gravity adjustment of a pair of image restoration filters for restoring the pair of image signals, on the basis of an image shift amount which is calculated from a pair of image signals of an object which are formed by focus-detecting pixels of an image pickup element having a plurality of focus-detecting pixels for respectively receiving light which passes through different exit pupil areas of a photographing lens; calculates the image restoration filters; generates a pair of restored image signals by restoring the pair of image signals by the calculated pair of image restoration filters; and detects a defocus amount of the photographing lens by using the pair of restored image signals.

12 Claims, 12 Drawing Sheets

FOCUS DETECTION APPARATUS, CONTROL METHOD THEREOF, AND IMAGE PICKUP APPARATUS

BACKGROUND OF THE INVENTION

1. Field of the Invention

The present invention relates to a focus detection apparatus and, more particularly, to a focus detection apparatus which is used in an image pickup apparatus such as an electronic camera or the like and to a control method of such a focus detection apparatus.

2. Description of the Related Art

Japanese Patent Application Laid-Open No. H04-267211 discloses an image pickup apparatus having an image pickup element constructed by two-dimensionally arranging pixels in each of which a photoelectric conversion unit is positioned with being relatively deviated from a microlens. According to the image pickup apparatus disclosed in Japanese Patent Application Laid-Open No. H04-267211, in a normal photographing of an image, an image is formed by adding the pixels in which the relative deviating directions between the microlens and the photoelectric conversion unit differ. In calculation of a focusing position of a photographing lens, the focusing position of the photographing lens is calculated by executing a correlation operation by using a pair of image signals which are generated by pixel series in which the relative deviating directions between the microlens and the photoelectric conversion unit differ.

In such a construction, if a vignetting due to the photographing lens occurs in a light flux for forming the image which is used for calculation of the focusing position, the image signals are nonsymmetric (decrease in coincidence degree of the images) because of the vignetting due to the photographing lens. Therefore, Japanese Patent Application Laid-Open No. H05-127074 discloses such a technique that specific image restoration filters stored in an image pickup apparatus are altered on the basis of an aperture ratio, an exit pupil position, and a defocus amount and applied to image signals, and thereafter, a focusing position is calculated by using the image signals.

According to the related arts, since the image restoration filters are applied to the image signals by a convolution, a pitch of the image restoration filter is made to coincide with a pitch of the image signals.

However, there is such a problem that when the image restoration filters are formed, since a center of gravity of the image restoration filters is deviated, the nonsymmetric images cannot be fully corrected and a focus detection precision is low.

SUMMARY OF THE INVENTION

It is an aspect of the invention to realize a focus detection of a high precision for reducing a center-of-gravity shift of image restoration filters which are used in the focus detection to correct asymmetry of images.

According to an aspect of the invention, a focus detection apparatus which includes an image pickup element having a plurality of focus-detecting pixels for respectively receiving light from an object which passes through different exit pupil areas of a photographing lens and forming a pair of image signals of the object, comprises: an image restoration filter calculation unit configured to calculate image restoration filters by performing a center-of-gravity adjustment of a pair of image restoration filters for restoring the pair of image signals on the basis of the pair of image signals of the object which are formed by the plurality of focus-detecting pixels and an image shift amount which is calculated from the pair of image signals; an image restoration processing unit configured to restore the pair of image signals by using the pair of image restoration filters calculated by the image restoration filter calculation unit, thereby generating a pair of restored image signals; and a focus detection unit configured to detect a defocus amount of the photographing lens by using the pair of restored image signals generated by the image restoration processing unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of the invention will be described in detail hereinbelow with reference to the drawings.

First Embodiment

The first embodiment of the invention will be described hereinbelow with reference to FIGS. 1 to 12.

Construction of Focus Detection Apparatus

Figure 1:
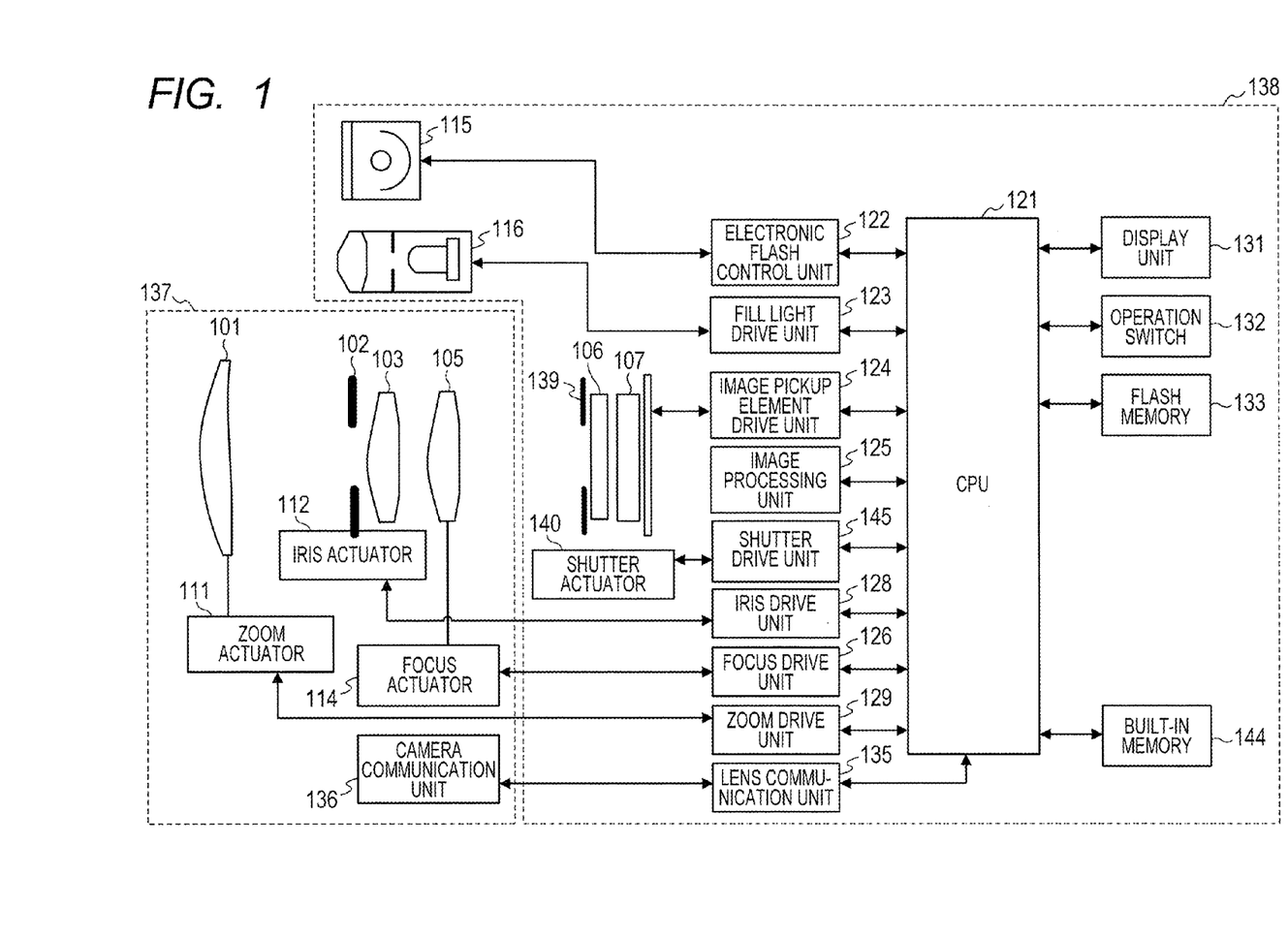
FIG. 1 is a partial constructional diagram of an image pickup apparatus having a focus detection apparatus according to an embodiment of the invention.

FIG. 1 is a partial constructional diagram of an image pickup apparatus such as an electronic camera or the like using a focus detection apparatus of the invention. The image pickup apparatus is constructed by: a camera main body 138 having an image pickup element; and a photographing lens 137 separate from the camera main body. The photographing lens 137 is exchangeably attached to the camera main body 138.

First, a construction of the photographing lens 137 will be described. A first lens group 101 is arranged at a front edge of a photographing optical system (focusing optical system) and is held so as to be movable backward and forward in an optical axis direction. An iris 102 adjusts a light amount at the time of photographing by adjusting an aperture diameter. A second lens group 103 is also provided, such that the iris 102 and the second lens group 103 are integratedly movable backward and forward in the optical axis direction and effect a magnification function (zooming function) by an interlocking operation with the backward/forward moving operation of the first lens group 101. A third lens group 105 performs a focus detection by the backward/forward movement thereof in the optical axis direction. By rotating a cam barrel (not shown), a zoom actuator 111 moves the first lens group 101 and the second lens group 103 backward and forward in the optical axis direction, thereby performing the magnification operation (zooming operation). An iris actuator 112 adjusts a photographing light amount by controlling the aperture diameter of the iris 102. A focus actuator 114 moves the third lens group 105 backward and forward in the optical axis direction, thereby performing the focus detection. A camera communication unit 136 transmits information regarding the lenses and receives information regarding the camera. The information regarding the lenses denotes information such as zoom state, iris state, focus state, lens frame, and the like. The camera communication unit 136 transmits those information to a lens communication unit 135 provided on the camera side.

Subsequently, the camera main body 138 will be described. An optical low pass filter 106 is an optical element for reducing a false color and moire of the photographed image. An image pickup element 107 is constructed by a C-MOS sensor and its peripheral units. As an image pickup element, a two-dimensional single-plate color sensor in which primary color mosaic filters of a Bayer array are on-chip formed on photosensitive pixels constructed by m pixels in the lateral direction and n pixels in the vertical direction is used. A shutter unit 139 controls an exposure time at the time of still image photographing. A shutter actuator 140 is provided to move the shutter unit 139. As an electronic flash 115 for illuminating the object upon photographing, a flash illumination device using a xenon tube is desirably used. However, an illumination device having an LED which continuously emits light may be used. An AF fill light unit 116 projects an image of a mask having a predetermined opening pattern onto a field through a projection lens, thereby improving a focus detection ability to a dark object or a low-contrast object. A CPU 121 in the camera makes various kinds of control of the camera main body and has an arithmetic operation unit, a ROM, a RAM, an A/D converter, a D/A converter, a communication interface unit, and the like. The CPU 121 executes control of a series of operations such as driving of various kinds of units provided in the camera, photographing, image processing, blurred image restoration processing, recording, and the like on the basis of a predetermined program stored in the ROM.

The CPU 121 also executes: an operation processing regarding an image plane phase difference AF; an operation processing regarding a center-of-gravity adjustment; and operation processings regarding an image restoration filter calculation and an image restoration processing. In the operation processing regarding the image plane phase difference AF, by executing a correlation operation to the pair of image signals, the CPU 121 calculates a phase difference representing a relative positional deviation between them and calculates (detects) a focus state (defocus amount) of the photographing lens 137 on the basis of the phase difference. On the basis of the defocus amount, the CPU 121 calculates an amount (drive information) adapted to move the focus lens in order to obtain the in-focus state. An electronic flash control unit 122 controls a light-on of the illumination unit 115 synchronously with the photographing operation. A fill light drive unit 123 controls a light-on of the AF fill light unit 116 synchronously with the focus detecting operation. An image pickup element drive unit 124 controls the image pickup operation of the image pickup element 107, A/D converts the obtained image signals, and transmits to the CPU 121. An image processing unit 125 executes processings such as γ conversion, color interpolation, JPEG compression, and the like of the image obtained by the image pickup element 107. A focus drive unit 126 drives the focus actuator 114 on the basis of a focus detection result, moves the third lens group 105 backward and forward in the optical axis direction, and performs the focus detection. An iris drive unit 128 drives the iris actuator 112 and controls an aperture of the iris 102. A zoom drive unit 129 drives the zoom actuator 111 in accordance with the zooming operation of the photographer. The lens communication unit 135 communicates with the camera communication unit 136 in the photographing lens 137. A shutter drive unit 145 drives the shutter actuator 140. A display unit 131 such as an LCD or the like displays information regarding a photographing mode of the camera, a preview image before the photographing, a confirming image after the photographing, an in-focus state display image at the time of the focus detection, and the like. An operation switch group 132 is constructed by a power switch, a release switch, a zooming operation switch, a photographing mode selecting switch, and the like. A detachable flash memory 133 records the photographed images. Various kinds of data necessary for the arithmetic operations which are executed in the CPU 121 is stored in a memory 144 built in the camera.

Structures of Image Picking-Up Pixel and Focus-Detecting Pixel

Figures 2A, 2B:
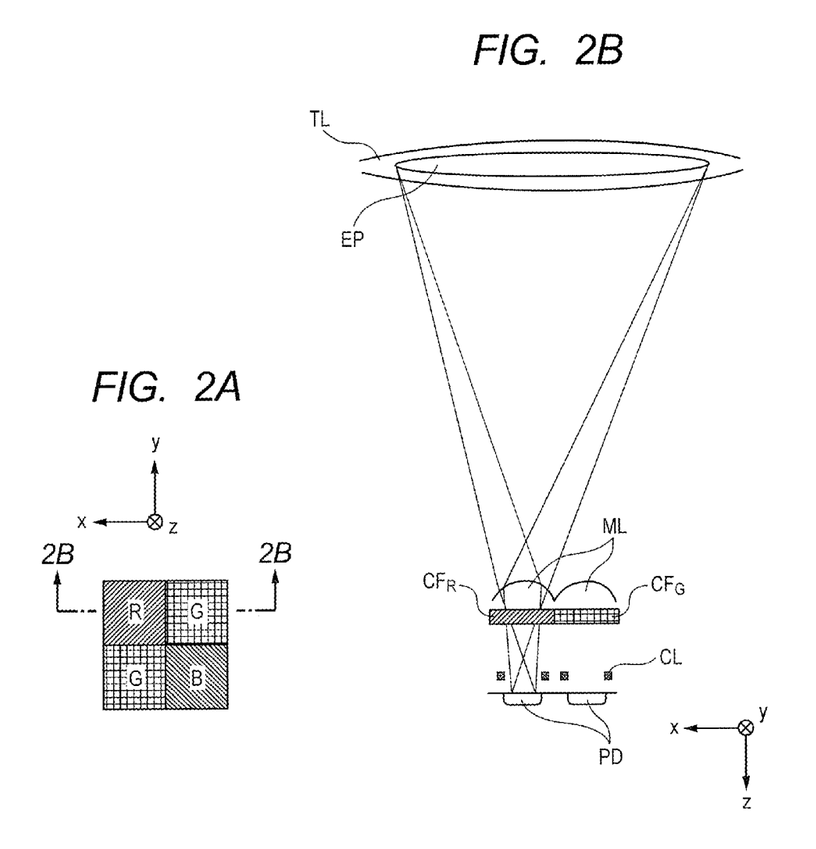
FIGS. 2A and 2B are diagrams conceptually illustrating structures of an image picking-up pixel having a color filter and a photographing optical system.
Figures 3A, 3B:
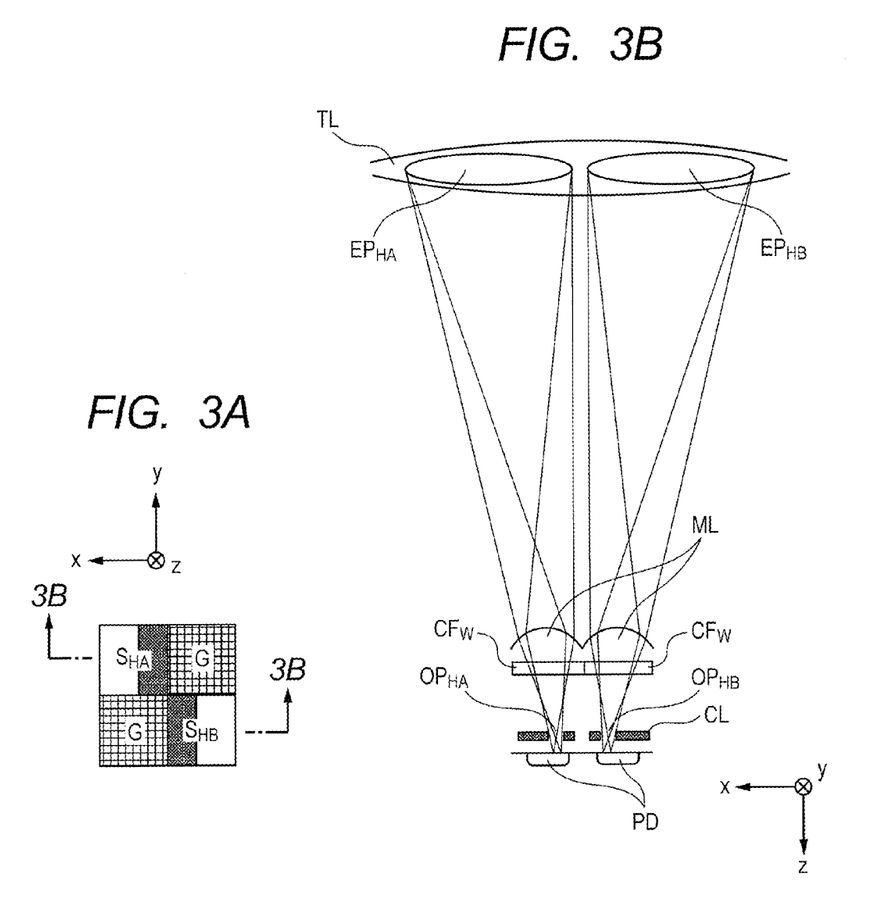
FIGS. 3A and 3B are diagrams conceptually illustrating structures of focus-detecting pixels arranged in an array of the image picking-up pixels and the photographing optical system.

Subsequently, the image plane phase difference AF will be described. FIGS. 2A and 2B and FIGS. 3A and 3B are diagrams for describing a structure of the image picking-up pixels included in the pixel array of the image pickup element 107 and a structure of the focus-detecting pixels for performing the image plane phase difference AF. In the embodiment, there is used a Bayer array in which among four pixels of (2 rows×2 columns), the pixels having the spectrum sensitivity of G (green) are arranged in the two pixels on a diagonal line and one pixel having the spectrum sensitivity of R (red) and one pixel having the spectrum sensitivity of B (blue) are arranged in the other two pixels (FIGS. 2A and 3A). However, such a technique that a photosensing portion of the image pickup element is divided into two portions and a defocus amount is detected by using a phase difference detection method is opened (for example, refer to Japanese Patent Application Laid-Open No. H01-216306). According to the invention, a similar result can be also obtained even in such an image pickup element that the photosensing portion is divided as mentioned above. In FIG. 3A, a first pixel group $S_{HA}$ and a second pixel group $S_{HB}$ are provided. They are distributed and arranged in the Bayer array in accordance with a predetermined rule. FIG. 2B is a cross sectional view taken along the line 2B-2B in FIG. 2A. FIG. 3B is a cross sectional view taken along the line 3B-3B in FIG. 3A. A defocus amount is calculated by the CPU 121 by using a phase difference between object images obtained from the first and second pixel groups. Since a technique for discretely arranging the focus-detecting pixels among the image picking-up pixels and a technique for performing the focus detection by using the focus-detecting pixels have already been disclosed and are well-known techniques (for example, refer to Japanese Patent Application Laid-Open No. 2000-020691), their description is omitted here.

Concept of Pupil Division Situation of Image Pickup Element

Figure 4:
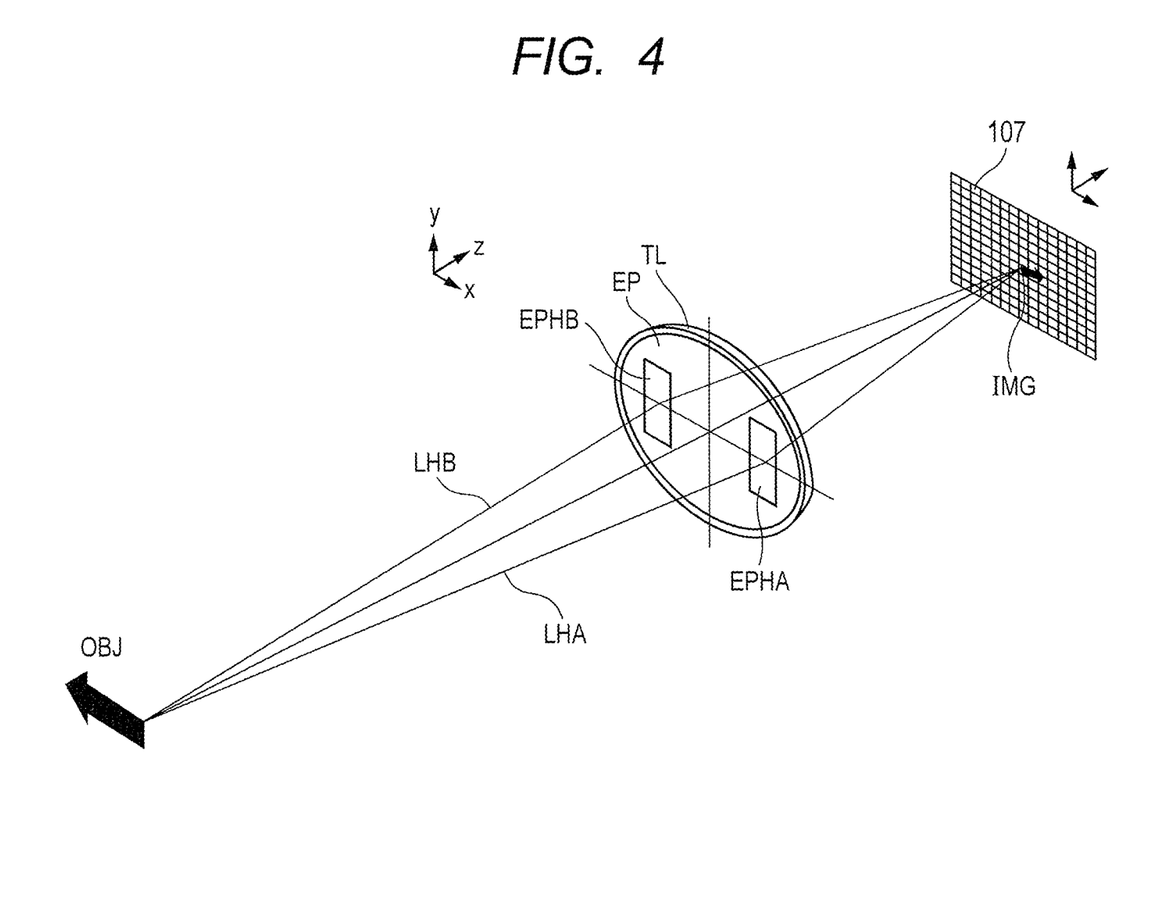
FIG. 4 is a diagram conceptually illustrating a pupil division in the photographing optical system.

FIG. 4 is a diagram for conceptually describing a pupil division situation of the photographing lens by the image pickup element in the embodiment. A photographing lens TL, the image pickup element 107, an object OBJ, and an image signal IMG are illustrated. As described in the plan view and the cross sectional view of the image picking-up pixel of the image pickup element in FIGS. 2A and 2B, the image picking-up pixel receives the light flux which passed through a whole exit pupil area EP of the photographing lens. As for the focus-detecting pixels for performing the pupil division in the x direction illustrated in FIGS. 3A and 3B, as described with reference to a plan view of FIG. 3A and a cross sectional view of FIG. 3B, the focus-detecting pixels have a pupil-dividing function. Specifically speaking, the pixel $S_{HA}$ in FIG. 3A receives the light flux which passed through a pupil on the side of the +x direction, that is, the light flux which passed through an exit pupil area $EP_{HA}$ in FIG. 4. By distributing the focus-detecting pixels into the whole area of the image pickup element 107, the focus detection can be performed in the whole image pickup area. Although a construction corresponding to the object having luminance distribution in the x direction is described here, by developing a similar construction also in the y direction, a construction corresponding to the object having luminance distribution in the y direction can be also used.

Figure 5A:
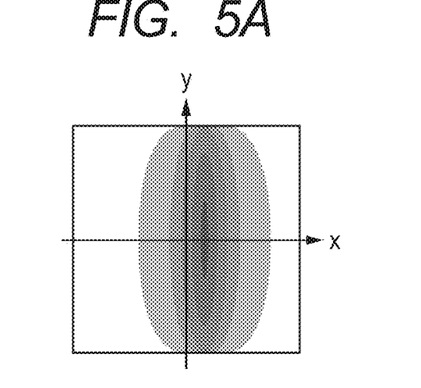
FIGS. 5A, 5B and 5C are conceptual diagrams of pupil intensity distribution of the focus-detecting pixels.
Figure 5B:
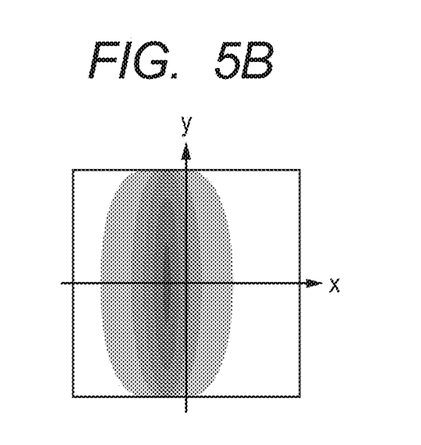
Figure 5C:
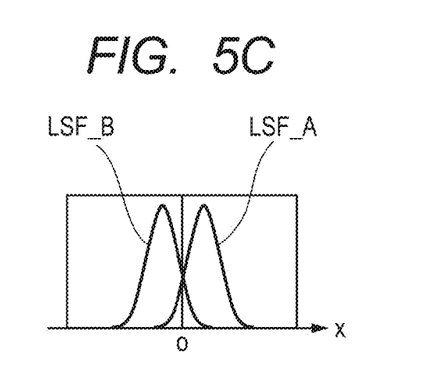

Pupil Intensity Distribution and Line Spread Functions in the Case where No Vignetting Occurs Intensity distribution in an exit pupil plane of the light flux is simply called "pupil intensity distribution" hereinbelow. FIGS. 5A to 5C are diagrams illustrating pupil intensity distribution of the focus-detecting pixels and line spread functions which are obtained from the pupil intensity distribution. FIG. 5A illustrates characteristics of the focus-detecting pixel $S_{HA}$. FIG. 5B illustrates characteristics of the focus-detecting pixel $S_{HB}$. An x axis and a y axis in FIGS. 5A to 5C correspond to an x axis and a y axis in FIG. 4. In FIGS. 5A to 5C, it is shown that the denser the color is, the higher the photosensing intensity is. In FIG. 3A, exit pupils are separately illustrated for an easy explanation, that is, the exit pupil of the focus-detecting pixel $S_{HA}$ is shown by $EP_{HA}$ and the exit pupil of the focus-detecting pixel $S_{HB}$ is shown by $EP_{HB}$. However, as illustrated in FIGS. 5A to 5C, actually, the image is blurred and spread by an influence of diffraction by opening portions $OP_{HA}$ and $OP_{HB}$ illustrated in FIG. 3B and there is a partially overlapped area portion between the exit pupils of the focus-detecting pixels $S_{HA}$ and $S_{HB}$. FIG. 5C is a diagram illustrating the line spread functions of the focus-detecting pixels. Those functions are obtained by projecting the pupil intensity distribution in FIGS. 5A and 5B in the y direction. In FIG. 5C, an axis of abscissa corresponds to the x axis in FIGS. 5A and 5B and an axis of ordinate indicates an intensity of the line spread function. An origin O corresponds to an optical axis position of the photographing lens.

As for intensity distribution of a point image which is formed on a focusing plane when certain point-source light passes through an exit pupil of an optical system, that is, what is called "point spread function", in the case where the optical system is stigmatic, it is considered that an exit pupil shape is reduced and projected onto the focusing plane. Since the line spread function is a projection of the point spread function, a projection of the pupil intensity distribution is assumed to be the line spread function. As illustrated in FIG. 5C, in the focus-detecting pixel at the center of the image pickup element, line spread functions LSF_A and LSF_B are substantially symmetric to the optical axis (shapes of the images substantially coincide). The line spread functions LSF_A and LSF_B are substantially symmetric in the x-axis direction around a center-of-gravity position in the x-axis direction of each line spread function as a center.

Figure 6A:
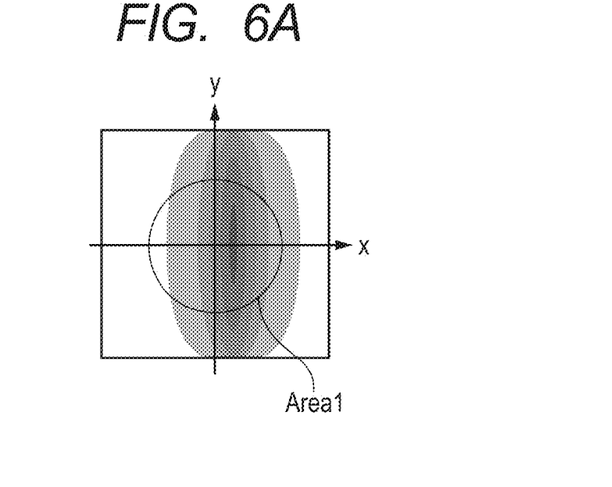
FIGS. 6A, 6B and 6C are conceptual diagrams of the pupil intensity of the focus-detecting pixel arranged at the center of a photosensing surface of an image pickup element.
Figure 6B:
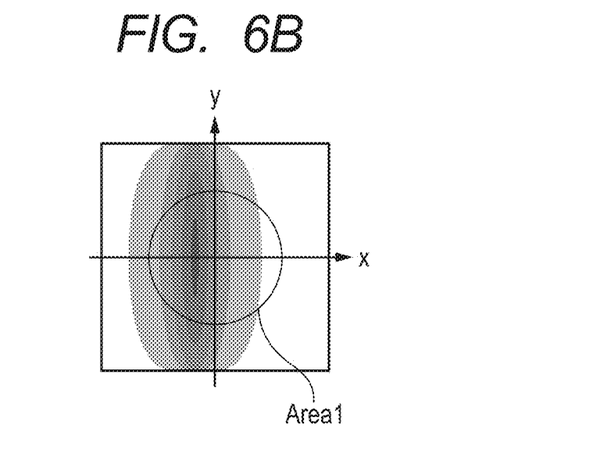
Figure 6C:
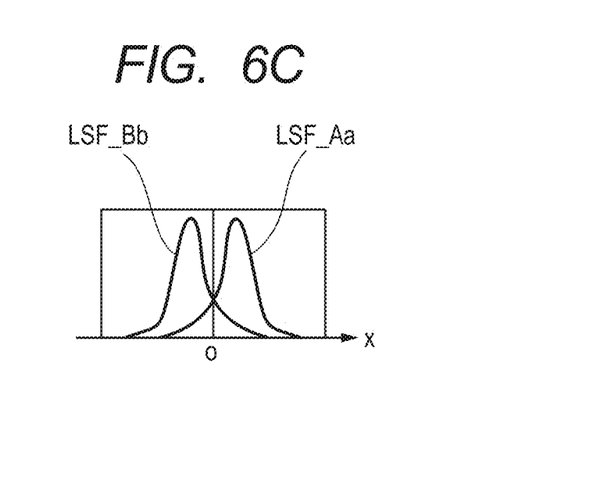

Pupil Intensity Distribution and Line Spread Functions in the Case where Vignetting Occurred FIGS. 6A to 6C are diagrams illustrating pupil intensity distribution in the case where vignetting due to the photographing lens occurred to the pupil intensity distribution in FIGS. 5A to 5C and line spread functions which are obtained from the pupil intensity distribution. FIG. 6A illustrates characteristics of the pupil intensity distribution of the focus-detecting pixel $S_{HA}$ in the case where the vignetting due to the photographing lens exists. FIG. 6B illustrates characteristics of the pupil intensity distribution of the focus-detecting pixel $S_{HB}$ in the case where the vignetting due to the photographing lens exists. Only inside portions of a shape shown by Area1 in the pupil intensity distribution of the focus-detecting pixels $S_{HA}$ and $S_{HB}$ illustrated in FIGS. 5A to 5C become areas where the light is received by the focus-detecting pixels $S_{HA}$ and $S_{HB}$. FIG. 6C is a diagram illustrating line spread functions in the case where the vignetting due to the photographing lens occurred. In a manner similar to FIG. 5C, the functions in FIG. 6C are obtained by projecting the pupil intensity distribution in FIGS. 6A and 6B in the y direction. In FIG. 6C, an axis of abscissa corresponds to the x axis in FIGS. 5A and 5B and an axis of ordinate indicates an intensity of the line spread function. An origin O corresponds to the optical axis position of the photographing lens. As illustrated in FIG. 6C, in the focus-detecting pixel at the center of the image pickup element, in a manner similar to FIG. 5C, line spread functions LSF_Aa and LSF_Bb are substantially symmetric to the optical axis. However, since the pupil intensity distribution is in a state where a part of it is cut away by the area Area1 as illustrated in FIGS. 6A and 6B, the whole line spread functions LSF_Aa and LSF_Bb are nonsymmetric c in the x-axis direction around the center-of-gravity position in the x-axis direction of each line spread function as a center.

Construction for focus detection of image pickup element 107 and image pickup element drive unit 124

Figure 7:
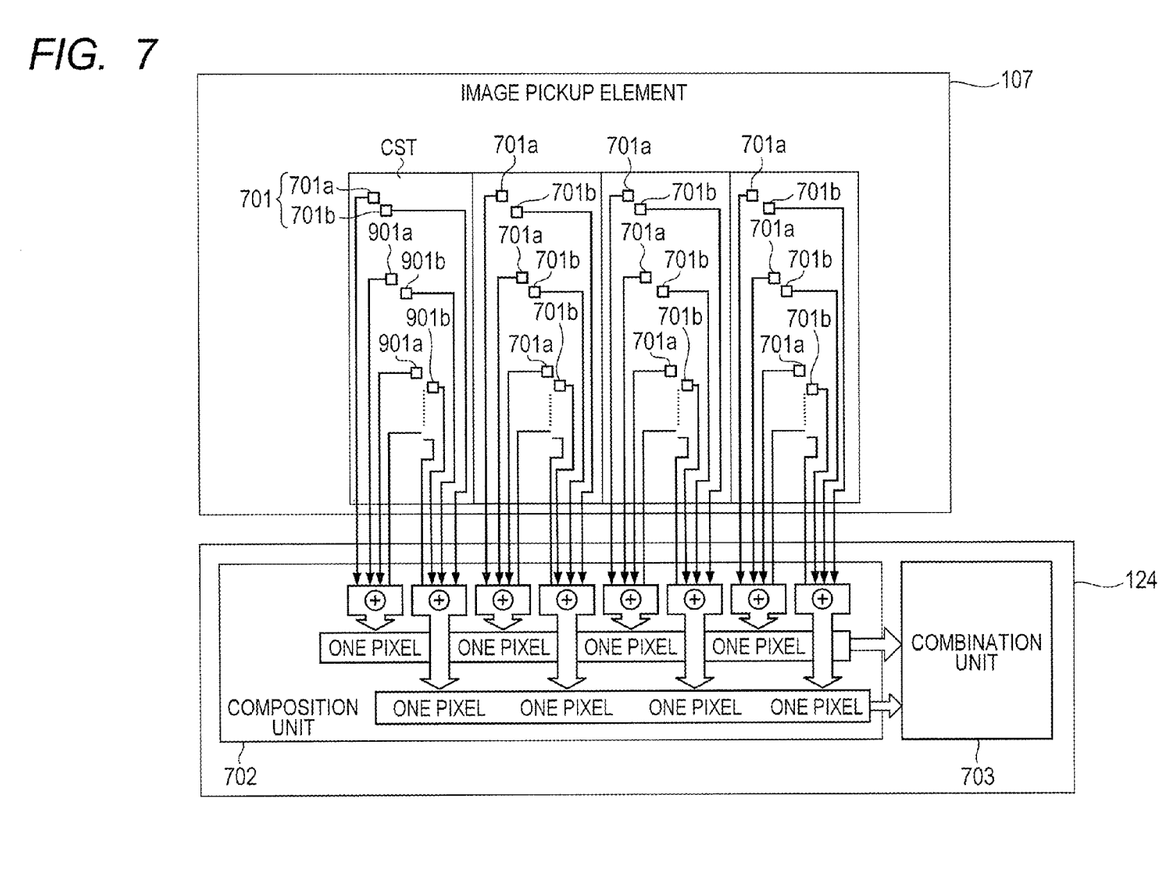
FIG. 7 is a constructional diagram of an image pickup element drive unit according to the embodiment of the invention.

FIG. 7 is a diagram schematically illustrating a focus detection construction of the image pickup element 107 and the image pickup element drive unit 124 in FIG. 1. An A/D conversion unit is omitted in FIG. 7 in order to easily describe it. With respect to the image pickup element, only the focus-detecting pixels are illustrated and a driving construction of the image picking-up pixel is omitted. The image pickup element 107 has a plurality of focus-detecting pixels 701 each of which is constructed by a focus-detecting pixel 701a and a focus-detecting pixel 701b described in FIGS. 3A and 3B.

The image pickup element 107 also includes a plurality of image picking-up pixels for photoelectrically converting the object image focused by the photographing lens. The focus-detecting pixels are distributively arranged in, for example, a two-dimensional array of the image picking-up pixels. The focus-detecting pixel 701a corresponds to the focus-detecting pixel $S_{HA}$ and the focus-detecting pixel 701b corresponds to the focus-detecting pixel $S_{HB}$. The image pickup element drive unit 124 includes a composition unit 702 and a combination unit 703. The image pickup element drive unit 124 allocates a plurality of sections (areas) CST to the image pickup plane of the image pickup element 107 so as to include a plurality of focus-detecting pixels 701. The image pickup element drive unit 124 can properly change a size of section CST, a layout and the number of sections CST, and the like. The composition unit 702 executes a processing for compositing output signals from the focus-detecting pixels 701a in each of the plurality of sections CST allocated to the image pickup element 107, thereby obtaining a first composition signal of one pixel. The composition unit 702 also executes a processing for compositing output signals from the focus-detecting pixels 701b in each section CST, thereby obtaining a second composition signal of one pixel. The combination unit 703 executes a processing for combining the focus-detecting pixels serving as first composition signals and obtaining a first combination signal and a processing for combining the second composition signals and obtaining a second combination signal. As mentioned above, the combination signal in which the focus-detecting pixels of the number as many as the number of sections have been combined is obtained for each of the focus-detecting pixels 701a and 701b. In the CPU 121, a defocus amount of the photographing lens is operated on the basis of the first combination signal and the second combination signal. Since the output signals of the focus-detecting pixels in the same pupil dividing direction arranged in the section are combined as mentioned above, even if a luminance of each focus-detecting pixel 701 is small, the luminance distribution of the object can be sufficiently detected.

Image Signals which are Output from Image Pickup Element 107

Figure 8:
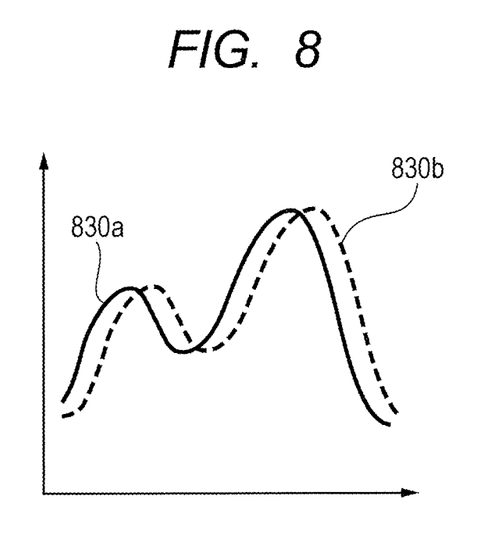
FIG. 8 is a diagram illustrating image signals which are obtained by the drive unit in FIG. 7.

FIG. 8 illustrates a pair of image signals which are formed by the focus-detecting pixel 701, composition unit 702, and combination unit 703 in FIG. 7 and transmitted to the CPU 121. In FIG. 8, an axis of abscissa indicates a pixel arranging direction of the combined signal and an axis of ordinate indicates an intensity of the signal. An image signal 830a is a signal formed by the focus-detecting pixel 701a and an image signal 830b is a signal formed by the focus-detecting pixel 701b, respectively. Since the focusing position of the photographing lens is in a defocus state, the image signal 830a is deviated to the left and the image signal 830b is deviated to the right. By calculating an image shift amount between the image signals 830a and 830b by a correlation operation, the defocus amount of the photographing lens can be known. In the focus detection in the embodiment, since the line spread functions become nonsymmetric to the center of gravity due to the vignetting by the photographing lens as described in FIGS. 6A to 6C, nonsymmetry also occurs between image signals A and B which are obtained by the focus-detecting pixels. In other words, a coincidence degree of the images decreases. In the focus detection of the phase difference method, if the decrease (nonsymmetry) of the coincidence degree of the images occurred, the image shift amount cannot be accurately calculated. In the embodiment, therefore, by correcting nonsymmetry between the obtained image signals, such a problem is solved.

Flowchart for Focus Detection

Figure 9:
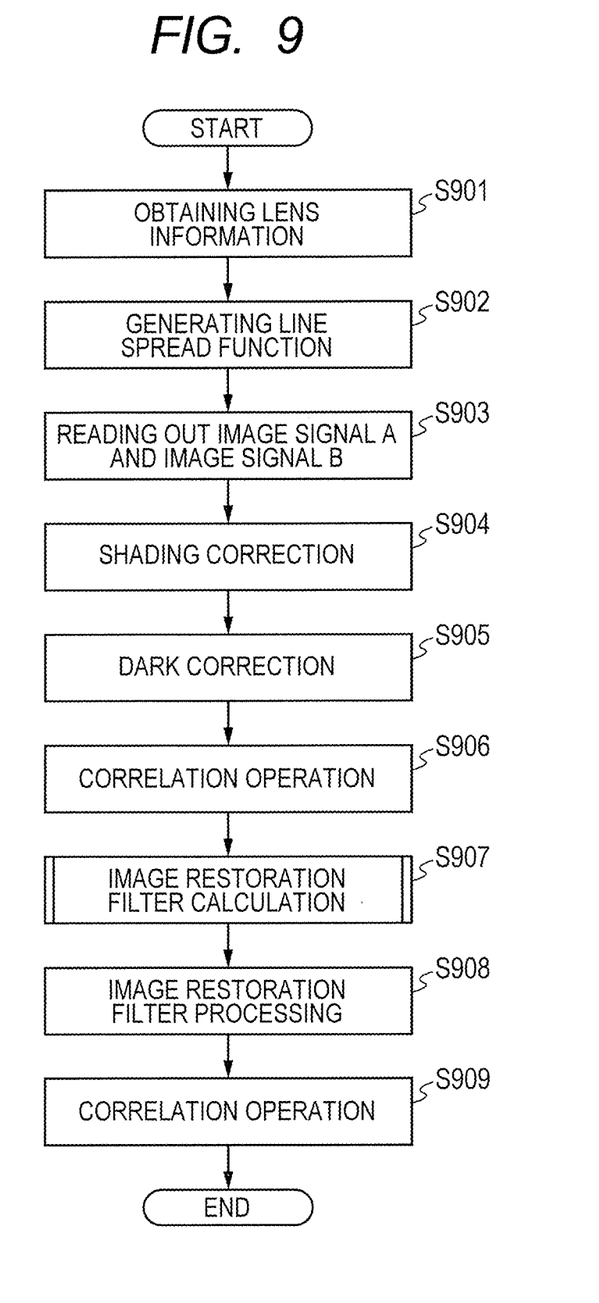
FIG. 9 is a flowchart for the focus detecting operation according to the embodiment of the invention.

Subsequently, a focus-detecting flowchart in the first embodiment will be described with reference to a flowchart of FIG. 9. The operation in the flowchart of FIG. 9 is executed by the CPU 121.

In step S901, lens information to know the vignetting state by the photographing lens is obtained. In step S902, to each focus-detecting pixel, the pupil intensity distribution stored in the ROM of the CPU 121 is read out and, together with the lens information to know the vignetting state by the photographing lens obtained in step S901, line spread functions LSF_A(j) and LSF_B(j) are calculated. In step S903, the image signals of the focus-detecting pixels at the focus-detecting position are read out and an image signal ImgA(i) and an image signal ImgB(i) are generated. In step S904, a shading of the image signals ImgA(i) and ImgB(i) generated in step S903 is predicted by using the lens information obtained in step S901 and the pupil intensity distribution, and a shading correction is performed. In step S905, to the image signals ImgA(i) and ImgB(i) generated in step S903, a dark correction is performed from a dark value stored in the ROM of the CPU 121. In step S906, by using the image signals ImgA(i) and ImgB(i) after the dark correction obtained in step S905, a provisional defocus amount is calculated by a correlation operation on the basis of the image shift amount. In step S907, image restoration filters are calculated on the basis of the provisional defocus amount calculated in step S906.

The calculation of the image restoration filters will now be described with reference to FIGS. 10 to 12. Although the image restoration filters to be calculated are Fil_Aa(i) and Fil_Bb(i), since their calculating methods are identical, the method will be described with respect to Fil_Aa(i) and a description about Fil_Bb(i) is omitted here.

At this time, the calculating methods of the image restoration filters differ in dependence on a magnitude relation between a sampling pitch Fil_p of the image restoration filter and a pitch LSF_p of a line spread function LSF_Aa(j) which have been held in the CPU 121 in advance.

In step S1001, the line spread function LSF_A(j) generated in step S902 is altered in accordance with the provisional defocus amount calculated in step S906 and LSF_Aa(j) is calculated. Subsequently, steps S1002 to S1006 will be described with reference to FIGS. 11 and 12.

In step S1002, the magnitude relation between the sampling pitch Fil_p of the image restoration filter and the pitch LSF_p of the line spread function LSF_Aa(j) which have been held in the CPU 121 in advance is compared. The image restoration filter is calculated from the line spread function by performing the sampling at the sampling pitch Fil_p. Therefore, when the sampling pitch Fil_p of the image restoration filter is larger than the pitch LSF_p of the line spread function LSF_Aa(j), a center-of-gravity shift of the image restoration filter and the line spread function LSF_Aa(j) is induced by the rough sampling. Therefore, in order to correct the center-of-gravity shift, steps S1003 to S1005 are executed. When the sampling pitch Fil_p of the image restoration filter is smaller than the pitch LSF_p of the line spread function LSF_Aa(j), since the image restoration filter obtains a value for interpolating the line spread function LSF_Aa(j) by the fine sampling, the center-of-gravity shift does not occur. In such a case, the processing routine advances to step S1006 without executing steps S1003 to S1005 for correcting the center-of-gravity shift.

Step S1003 is executed in the case where the sampling pitch Fil_p of the image restoration filter is larger than the pitch LSF_p of the line spread function LSF_Aa(j) as a result of the comparison in step S1002. First, an X coordinate Cog_XAa of the center of gravity of the line spread function LSF_Aa(j) generated in step S1001 is calculated. Further, an X coordinate Cog_XAaa of the center of gravity of LSF_Aaa (i) which is obtained by a method whereby the line spread function LSF_Aa(j) generated in step S1001 is sampled every sampling pitch Fil_p which has been held in the CPU 121 in advance is calculated.

A center-of-gravity difference ΔCog_XA is calculated from two calculated centers of gravity Cog_XAa and Cog_X-Aaa. In step S1004, a length of image restoration filter is calculated by using the center-of-gravity difference ΔCog_XA calculated in step S1003. By using the center-of-gravity difference ΔCog_XA and ΔCog_XB whose description is omitted here, the image restoration filter length which is calculated is set so as to include both of the image restoration filters. In step S1005, an X coordinate Fil_XA(i) of the image restoration filter Fil_A(i) is calculated. The center-of-gravity difference ΔCog_XA calculated in step S1003 is subtracted from a common X coordinate LSF_XA(i) of the line spread functions LSF_Aaa(i) and LSF_Bbb(i) altered in step S1001, thereby calculating the X coordinate Fil_XA(i) of the image restoration filter. In step S1006, a value Fil_A(i) of the image restoration filter after the center-of-gravity adjustment is calculated.

A calculating method of the value Fil_A(i) of the image restoration filter after the center-of-gravity adjustment will be described with reference to FIG. 12. An intensity in the filter length calculated in step S1004 is calculated by integrating an area of the line spread function LSF_Aa(j) altered in step S1001 every sampling pitch Fil_p of the image restoration filter which has been held in the CPU 121 in advance. At this time, since the X coordinate Fil_XA(i) of the image restoration filter changes in dependence on the magnitude relation between the sampling pitch Fil_p of the image restoration filter and the pitch LSF_p of the line spread function LSF_Aa (j), an integration range differs.

Figure 12:
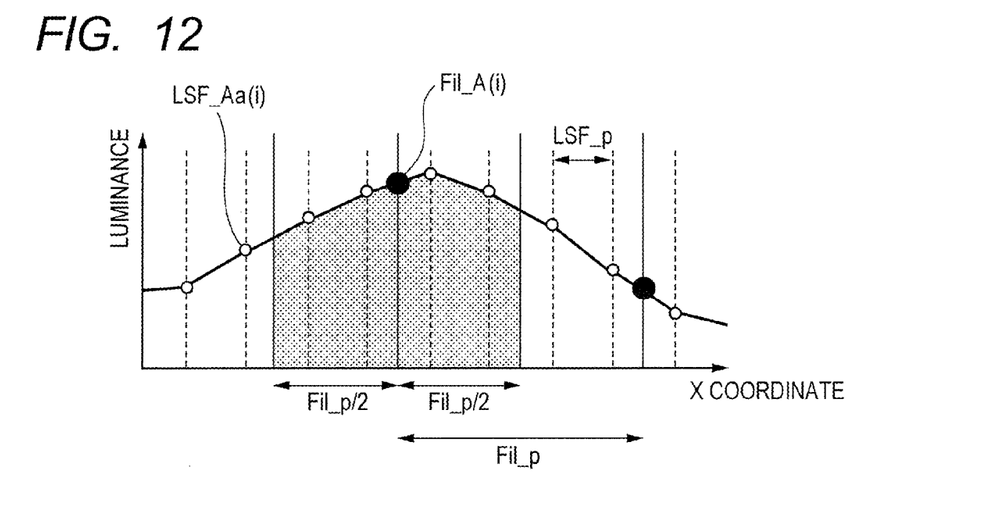
FIG. 12 is a diagram conceptually illustrating a calculation of an intensity for the center-of-gravity adjustment of the image restoration filters in the calculating operation of the image restoration filters according to the embodiment of the invention.

FIG. 12 is a diagram for describing a case of Fil_p>LSP_p. At this time, a value of the ith image restoration filter Fil_A(i) which is calculated is calculated by integrating an area of the line spread function LSF_Aa(j) existing in a range of ±Fil_p/2 around Fil_A(i) as a center. The area is calculated by an amount corresponding to the image restoration filter length calculated in step S1004 as mentioned above and values of the image restoration filters Fil_A(i) and Fil_B(i) after the center-of-gravity adjustment are calculated. In step S1007, the areas of the image restoration filters Fil_A(i) and Fil_B(i) are equalized in order to eliminate a light amount difference after the image restoration. The image restoration filters Fil_A(i) and Fil_B(i) after the center-of-gravity adjustment which are calculated in step S1006 are normalized, the intensities are equalized, and the image restoration filters Fil_Aa(i) and Fil_Bb(i) are calculated. When a series of image restoration filter calculating subroutine is finished, the processing routine advances to step S908 in FIG. 9.

In step S908, the image restoration filters Fil_Aa (i) and Fil_Bb (i) calculated in step S907 are convoluted to the image signals ImgA(i) and ImgB(i), thereby generating restored image signals ReImgA(i) and ReImgB(i). In step S909, an image shift amount is calculated by a well-known correlation operation by using the restored image signals ReImgA(i) and ReImgB(i) calculated in step S908 in a manner similar to step S906, respectively. A defocus amount of the photographing lens is calculated on the basis of the image shift amount. In this manner, a series of focus detecting operation is finished.

As mentioned above, according to the first embodiment, since the defocus amount is calculated by adjusting the centers of gravity of the image restoration filters, the optimum image restoration filters can be set.

By adjusting the centers of gravity of the image restoration filters, the image signals in which an affect of an aliasing distortion of the image restoration filter around an in-focus position is reduced can be restored.

Further, since the image signals in which the affect of the aliasing distortion of the image restoration filter around the in-focus position is reduced can be restored by adjusting the centers of gravity of the image restoration filters, the focus detection of a higher precision can be performed.

Although the image shift method is used in the correlation operation in the first embodiment, a similar result can be obtained even by using another method.

Second Embodiment

The second embodiment is a modification of the first embodiment. The second embodiment of the invention will be described hereinbelow with reference to FIGS. 9 and 13.

The centers of gravity of the image restoration filters Fil_A (i) and Fil_B(i) are adjusted in the first embodiment. On the other hand, it is a feature of the second embodiment that whether or not the centers of gravity of the image restoration filters are switched in accordance with the defocus amount. The operation according to a flowchart of FIG. 13 is executed by the CPU 121.

The focus detecting operation in the second embodiment is executed in accordance with the flowchart of FIG. 9 in a manner similar to the first embodiment. In the present embodiment, the operation for calculating the image restoration filters in step S907 differs from that in the first embodiment. Therefore, in the embodiment, only the calculating operation of the image restoration filters will be described and the description in steps S901 to S906 is omitted.

Figure 13:
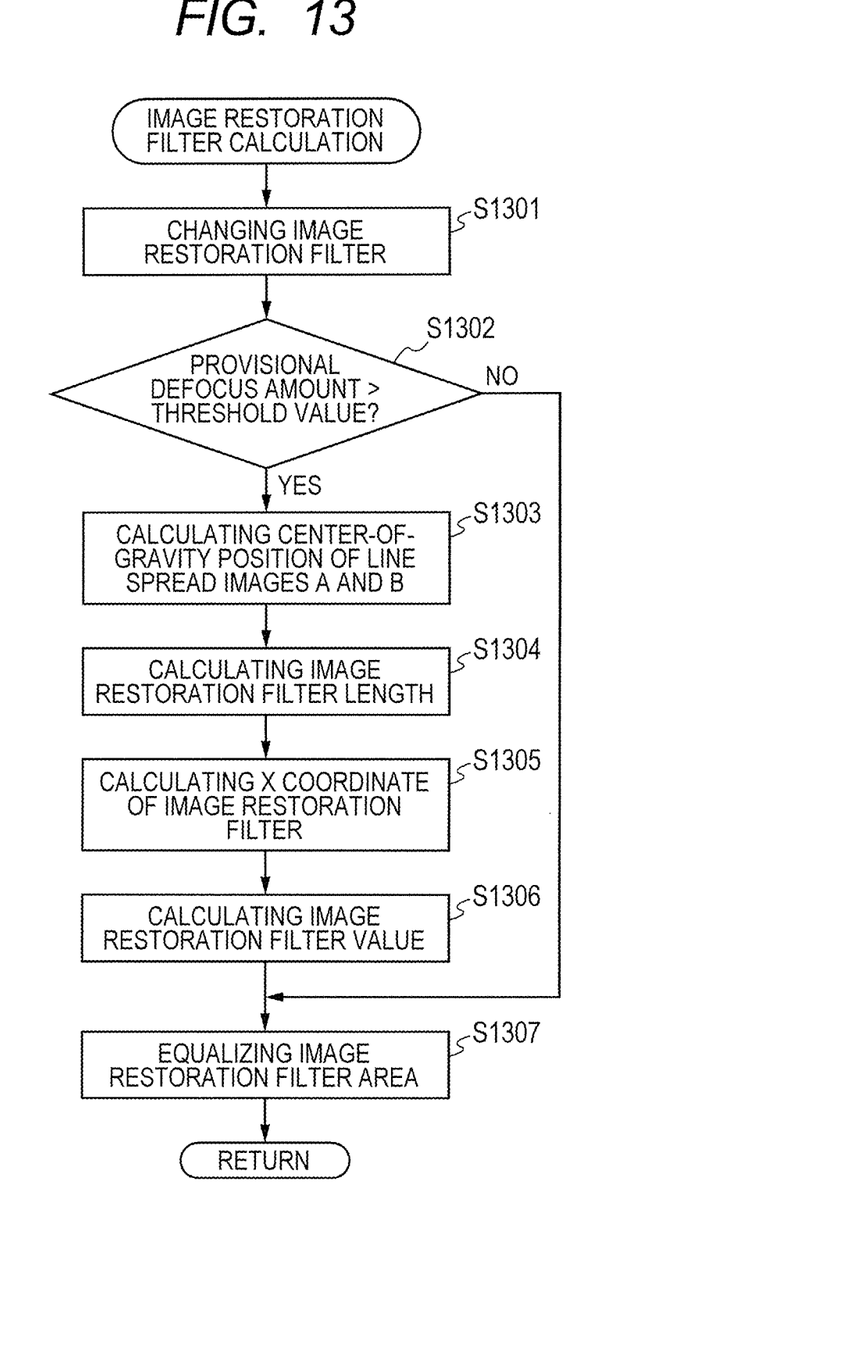
FIG. 13 is a flowchart for the calculating operation of image restoration filters according to the second embodiment of the invention.

FIG. 13 shows the flowchart for the calculating operation of the image restoration filters according to the present embodiment. The operation of the present embodiment for calculating the image restoration filters on the basis of the provisional defocus amount calculated in step S906 in FIG. 9 will be described with reference to the flowchart in the embodiment.

In step S1301, the line spread functions LSF_A(i) and LSF_B(i) generated in step S902 are altered in accordance with the provisional defocus amount calculated in step S906. In step S1302, whether or not the provisional defocus amount calculated in step S906 is larger than a preset threshold value is discriminated. If it is determined that the provisional defocus amount is larger than the preset threshold value, step S1303 follows in order to adjust the centers of gravity of the image restoration filters Fil_A(i) and Fil_B(i). If it is determined that the provisional defocus amount is equal to or less than the preset threshold value, since the center-of-gravity adjustment of the image restoration filters Fil_A(i) and Fil_B (i) is not performed, step S1307 follows. Since processing steps S1303 to S1306 are substantially the same as those in the first embodiment, their description is omitted here. In step S1307, in a manner similar to step S1306, the areas of the image restoration filters Fil_A(i) and Fil_B(i) after the center-of-gravity adjustment which are calculated in step S1306 are calculated, the intensities are equalized, and the image restoration filters Fil_Aa(i) and Fil_Bb(i) are calculated. When a series of image restoration filter calculating operation is finished, the processing routine is returned to the main flow of FIG. 9 and step S908 is executed. In step S908, the image restoration filters Fil_Aa(i) and Fil_Bb(i) calculated in accordance with the operation of FIG. 13 are convoluted to the image signals ImgA(i) and ImgB(i), thereby obtaining the restored image signals ReImgA(i) and ReImgB(i), respectively. In step S909, in a manner similar to step S906, an image shift amount is calculated by the well-known correlation operation by using the restored image signals ReImgA(i) and ReImgB(i) calculated in step S908, respectively. A defocus amount of the photographing lens is calculated on the basis of the image shift amount. In this manner, a series of focus detecting flow is finished.

Reasons why the center-of-gravity adjustment of the image restoration filters is performed in accordance with the defocus amount will now be described. When the defocus amount is large, the number of pixels showing the image restoration filters is large and shapes of the image restoration filters Fil_A(i) and Fil_B(i) which are generated by sampling can be accurately expressed to a certain extent. Therefore, nonsymmetry between the image signals ImgA(i) and ImgB(i) is reduced by the image restoration processing unit and the defocus amount can be precisely calculated. On the other hand, when the defocus amount is small, the number of pixels showing the image restoration filters is small, an aliasing distortion is caused by sampling, and the shapes of the image restoration filters Fil_A(i) and Fil_B(i) cannot be accurately expressed. Therefore, the centers of gravity of the formed image restoration filters Fil_A(i) and Fil_B(i) are shifted. When the image restoration processing unit executes the image restoration, nonsymmetry between the image signals ImgA(i) and ImgB(i) cannot be perfectly corrected and the defocus amount cannot be precisely calculated. From the above reasons, it is desirable to adjust the centers of gravity of the image restoration filters Fil_A(i) and Fil_B(i) in accordance with the defocus amount. By this method, such a situation that the center-of-gravity positions of the image restoration filters Fil_A(i) and Fil_B(i) are changed by the aliasing distortion at the time of sampling of the image restoration filters can be reduced.

As mentioned above, according to the second embodiment, by discriminating whether or not the center-of-gravity adjustment processing of the image restoration filters is executed in accordance with the provisional defocus amount, a higher processing speed can be realized as compared with the first embodiment.

Although the image shift method is used in the correlation operation in the first embodiment, a similar result can be obtained even by using another method.

According to the above-described invention, the center-of-gravity shift of the image restoration filters for correcting nonsymmetry between the images is reduced even around the in-focus position and the focus detection of a high precision can be realized.

Figure 10:
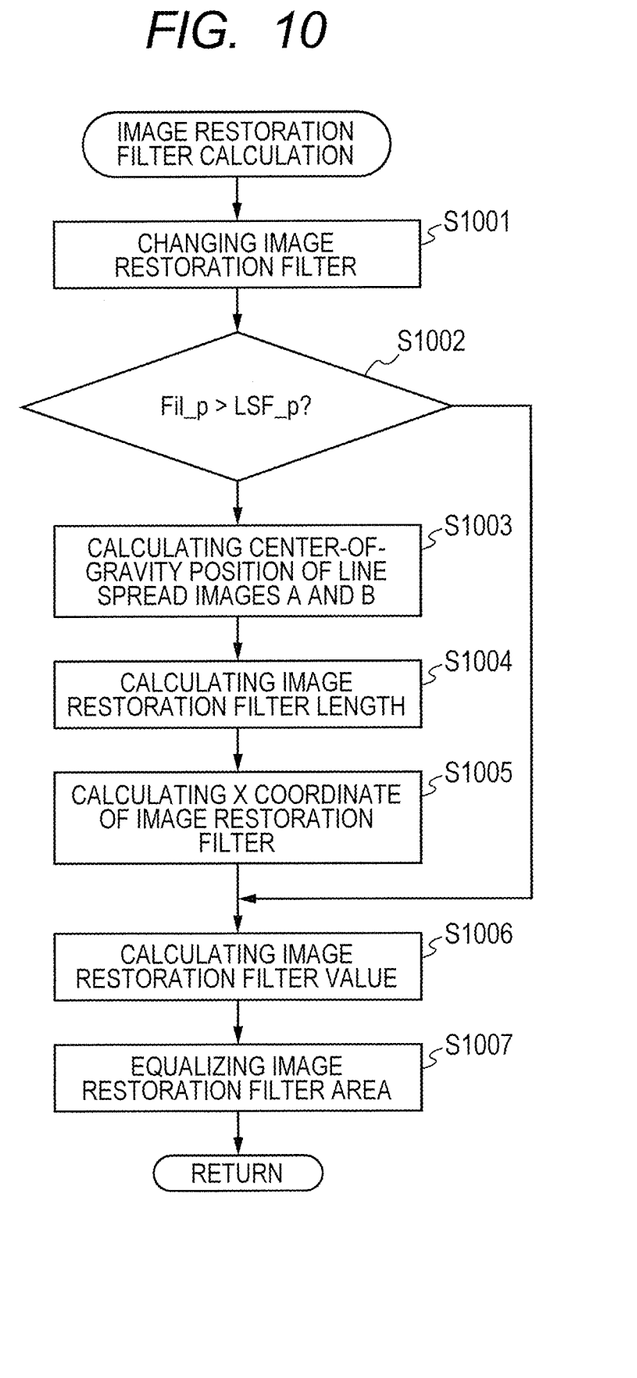
FIG. 10 is a flowchart for the calculating operation of image restoration filters according to the first embodiment of the invention.
Figure 11:
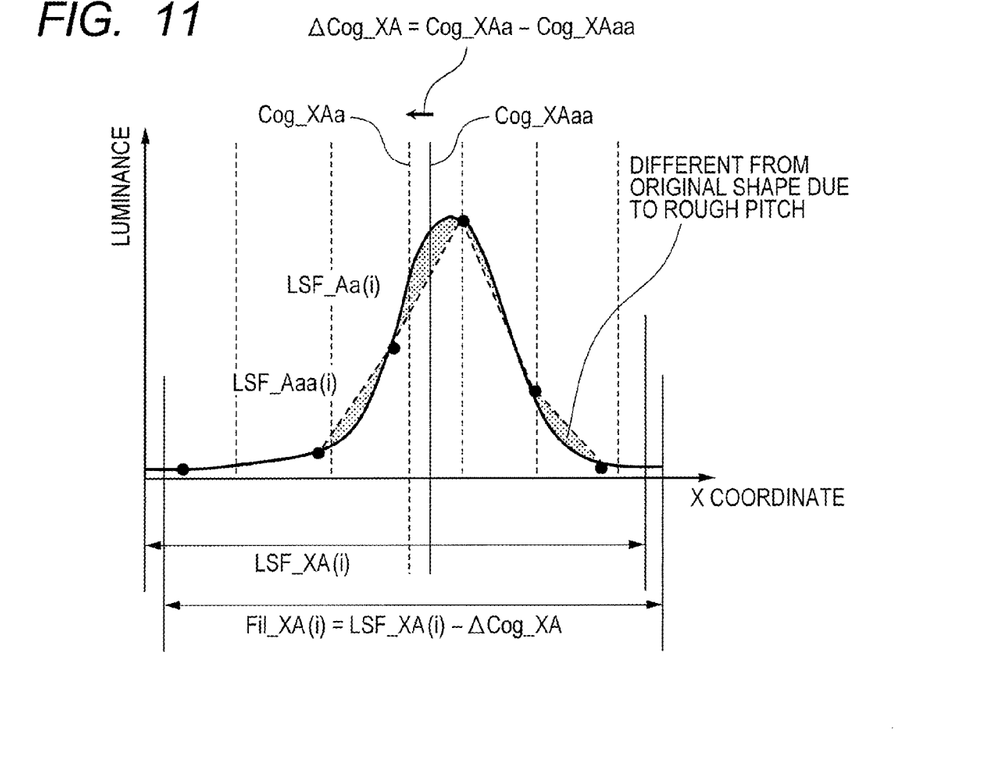
FIG. 11 is a diagram conceptually illustrating a change of an X coordinate for a center-of-gravity adjustment of the image restoration filters in the calculating operation of the image restoration filters according to the embodiment of the invention.

In the foregoing embodiment, the functions of the processings shown in FIGS. 9, 10, and 13 are realized by a method whereby a program for realizing the functions of the processings is read out from a memory and the CPU of the control unit 121 executes the program.

The invention is not limited to the foregoing constructions but the functions of a part or all of the processings shown in FIGS. 9, 10, and 13 may be realized by dedicated hardware. The foregoing memory may be constructed by a magnetooptic disk device, a non-volatile memory such as a flash memory or the like, a read-only recording medium such as a CD-ROM or the like, or a volatile memory other than a RAM. The memory may be constructed by a computer-readable and writable recording medium by a combination of them.

The foregoing processings may be executed by a method whereby the program for realizing the functions of the processings shown in FIGS. 9, 10, and 13 is recorded into a computer-readable storage medium and a computer system reads and executes the program recorded in the storage medium. It is assumed that "computer system" mentioned here incorporates an OS and hardware such as peripheral equipment or the like. Specifically speaking, the invention also incorporates a case where the program read out of the storage medium is written into a memory provided for a function expanding board inserted in the computer or a function expanding unit connected to the computer, after that, a CPU or the like provided for the function expanding board or function expanding unit executes a part or all of the processings on the basis of instructions of the program, and the functions of the foregoing embodiments are realized by those processings.

"computer-readable storage medium" denotes a portable medium such as flexible disk, magnetooptic disk, ROM, CD-ROM, or the like or a storage device such as a hard disk or the like built in the computer system. Further, "computer-readable storage medium" also incorporates a medium in which the program is held for a predetermined time. For example, it is a volatile memory (RAM) built in the computer system serving as a server or client in the case where the program is transmitted through a network such as Internet or the like or a communication line such as a telephone line or the like.

The foregoing program may be transmitted from the computer system in which the program is stored in the storage device or the like to another computer system through a transmission medium or by a transmission wave in the transmission medium. "transmission medium" for transmitting the program denotes a medium having an information transmitting medium such as network (communication network) like Internet or the like or communication line (communication wire) like a telephone line or the like.

The foregoing program may be a program for realizing a part of the foregoing functions. Further, the program may be a device which can realize the foregoing functions by a combination with a program which has already been recorded in the computer system, that is, what is called a differential file (differential program).

A program product such as a computer-readable storage medium in which the foregoing program is recorded can be also applied as an embodiment of the invention. The foregoing program, storage medium, transmission medium, and program product are also incorporated in the purview of the invention.

The foregoing embodiments have merely been shown as specific examples when embodying the invention and a technical scope of the invention should not be limitedly interpreted by them. That is, the invention can be embodied by various forms without departing from its technical scope of the invention or its principal features.

This application claims the benefit of Japanese Patent Application No. 2012-089070 filed on Apr. 10, 2012, which is hereby incorporated by reference herein in its entirety.

What is claimed is:

1. A focus detection apparatus which includes an image pickup element having a plurality of focus-detecting pixels for respectively receiving light from an object which passes through different exit pupil areas of a photographing lens and forming a pair of image signals of the object, comprising:

an image restoration filter calculation unit configured to calculate image restoration filters by performing a center-of-gravity adjustment of a pair of image restoration filters for restoring a first pair of image signals on the basis of a second pair of image signals different from the first pair of image signals and an image shift amount which is calculated from a pair of image signals of the object which are formed by the plurality of focus-detecting pixels;

an image restoration processing unit configured to restore the first pair of image signals by using the pair of image restoration filters calculated by the image restoration filter calculation unit, thereby generating a pair of restored image signals; and a focus detection unit configured to detect a defocus amount of the photographing lens by using the pair of restored image signals generated by the image restoration processing unit.

2. An apparatus according to claim 1, wherein the image restoration filter calculation unit alters the first pair of image signals in accordance with the image shift amount and performs the center-of-gravity adjustment of the image restoration filters by using a center-of-gravity difference which is obtained from the altered image signals.

3. An apparatus according to claim 2, wherein the image restoration filter calculation unit samples the altered image signals at a sampling pitch of the image restoration filter and calculates the center-of-gravity difference from a center of gravity of the sampled image signal and a center of gravity of the altered image signal, and wherein the sampling pitch of the image restoration filter differs from a pitch of the first pair of image signals.

4. An apparatus according to claim 3, wherein the image restoration filter calculation unit compares the sampling pitch of the image restoration filter with the pitch of the first pair of image signals and performs the center-of-gravity adjustment in accordance with a result of the comparison to calculate the image restoration filters.

5. An apparatus according to claim 1, further comprising a correlation operation unit configured to calculate the image shift amount from the first and second pairs of image signals on the basis of a phase difference calculated by a correlation operation of the first and second pairs of image signals, wherein the correlation operation unit calculates the defocus amount on the basis of a phase difference calculated through a correlation operation to the pair of restored image signals.

6. An apparatus according to claim 1, further comprising a lens drive unit configured to generate drive information of the photographing lens on the basis of the defocus amount detected by the focus detection unit.

7. An apparatus according to claim 1, wherein the image restoration filter calculation unit switches whether or not the center-of-gravity adjustment is performed in accordance with the defocus amount.

8. An image pickup apparatus comprising:
the focus detection apparatus according to claim 1;
an image pickup unit configured to receive the light from the object by a plurality of image picking-up pixels included in the image pickup element, form image signals, and output them;
an image processing unit configured to process the image signals output from the image pickup unit; and
a control unit configured to control the focus detection apparatus, the image pickup unit, and the image processing unit to perform a photographing of the object.

9. A focus detection method using an image pickup element having a plurality of focus-detecting pixels for respectively receiving light from an object which passes through different exit pupil areas of a photographing lens and forming a pair of image signals of the object, comprising:

an image restoration filter calculation step of calculating image restoration filters by performing a center-of-gravity adjustment of a pair of image restoration filters for restoring a first pair of image signals on the basis of a second pair of image signals different from the first pair of image signals and an image shift amount which is calculated from a pair of image signals of the object which are formed by the plurality of focus-detecting pixels;

an image restoration processing step of restoring the first pair of image signals by using the pair of image restoration filters calculated in the image restoration filter calculation step thereby generating a pair of restored image signals; and a focus detection step of detecting a defocus amount of the photographing lens by using the pair of restored image signals generated in the image restoration processing step.

10. A non-transitory computer-readable storage medium storing a program comprising a program code for causing a computer to function in a control method of a focus detection apparatus which includes an image pickup element having a plurality of focus-detecting pixels for respectively receiving light from an object which passes through different exit pupil areas of a photographing lens and forming a pair of image signals of the object, as:

an image restoration filter calculation unit configured to calculate image restoration filters by performing a center-of-gravity adjustment of a pair of image restoration filters for restoring a first pair of image signals on the basis of a second pair of image signals different from the first pair of image signals and an image shift amount which is calculated from a pair of image signals of the object which are formed by the plurality of focus-detecting pixels, perform a center-of-gravity adjustment of a pair of image restoration filters for restoring the first pair of image signals and calculate the image restoration filters;

an image restoration processing unit configured to restore the first pair of image signals by using the pair of image restoration filters calculated by the image restoration filter calculation unit, thereby generating a pair of restored image signals; and a focus detection unit configured to detect a defocus amount of the photographing lens by using the pair of restored image signals generated by the image restoration processing unit.

11. An apparatus according to claim 1, wherein the second pair of image signals is a line spread function.

12. An apparatus according to claim 1, wherein the second pair of image signals is obtained by projecting a pupil intensity distribution of the plurality of focus-detecting pixels in a predetermined direction.

* * * * *